(12) United States Patent
Tong et al.

(10) Patent No.: US 11,996,560 B1
(45) Date of Patent: May 28, 2024

(54) POSITIVE ELECTRODE MATERIAL OF LITHIUM-ION BATTERY AND PREPARATION METHOD THEREFOR

(71) Applicant: Beijing Easpring Material Technology Co., Ltd., Beijing (CN)

(72) Inventors: Junfan Tong, Beijing (CN); Yanbin Chen, Beijing (CN); Yuqiang Jin, Beijing (CN); Wenbo Wang, Beijing (CN); Xuequan Zhang, Beijing (CN); Yafei Liu, Beijing (CN)

(73) Assignee: Beijing Easpring Material Technology Co., Ltd., Beijing (CN)

( * ) Notice: Subject to any disclaimer, the term of this patent is extended or adjusted under 35 U.S.C. 154(b) by 0 days.

(21) Appl. No.: 18/383,715

(22) Filed: Oct. 25, 2023

Related U.S. Application Data

(63) Continuation of application No. PCT/CN2023/078661, filed on Feb. 28, 2023.

(30) Foreign Application Priority Data

Dec. 30, 2022 (CN) .......................... 202211742689.6

(51) Int. Cl.
*H01M 4/00* (2006.01)
*C01G 53/00* (2006.01)
(Continued)

(52) U.S. Cl.
CPC ............ *H01M 4/525* (2013.01); *C01G 53/50* (2013.01); *C01G 53/66* (2013.01); *H01M 4/131* (2013.01);
(Continued)

(58) Field of Classification Search
CPC ...... H01M 4/364; H01M 4/505; H01M 4/043; H01M 10/0505; H01M 4/525; H01M 4/0404; H01M 4/1391
See application file for complete search history.

(56) References Cited

FOREIGN PATENT DOCUMENTS

| CN | 101047247 | 10/2007 |
|---|---|---|
| CN | 110651388 | 1/2020 |

(Continued)

OTHER PUBLICATIONS

Kao et al., Lithium Metal Oxide Containing Batteries Having Improved Rate Capability, Mar. 2016, See the Abstract. (Year: 2016).*

(Continued)

*Primary Examiner* — Cynthia H Kelly
*Assistant Examiner* — Monique M Wills
(74) *Attorney, Agent, or Firm* — Warner Norcross + Judd LLP

(57) ABSTRACT

The present disclosure relates to a positive electrode material for a lithium ion battery and its preparation. The positive electrode material in accordance with the present disclosure has an intrinsic specific surface area of 5-13 $m^2/g$. The positive electrode material in accordance with the present disclosure has an intrinsic specific surface area and an intrinsic pore size within the required ranges. In this regard, the positive electrode material in accordance with the present disclosure has excellent particle strength, excellent Li ion transference ability, and good resistance to electrolyte erosion. When used in lithium batteries, it may impart the batteries with excellent rate performance and cycle performance. The present disclosure also relates to a method for preparing the positive electrode material.

6 Claims, 1 Drawing Sheet

(51) Int. Cl.
*H01M 4/131* (2010.01)
*H01M 4/505* (2010.01)
*H01M 4/525* (2010.01)
*H01M 10/0525* (2010.01)

(52) U.S. Cl.
CPC ....... *H01M 4/505* (2013.01); *H01M 10/0525* (2013.01); *C01P 2002/52* (2013.01); *C01P 2002/72* (2013.01); *C01P 2004/03* (2013.01); *C01P 2004/61* (2013.01); *C01P 2006/10* (2013.01); *C01P 2006/12* (2013.01); *C01P 2006/40* (2013.01)

(56) References Cited

FOREIGN PATENT DOCUMENTS

| | | | |
|---|---|---|---|
| CN | 111446444 | 7/2020 | |
| CN | 115043440 | 9/2022 | |
| WO | WO-2016048862 A1 * | 3/2016 | ............. C01G 53/50 |
| WO | 2021/136243 | 7/2021 | |

OTHER PUBLICATIONS

International Search Report (English) for International Application No. PCT/CN2023/078661 mailed Jun. 23, 2023.

\* cited by examiner

POSITIVE ELECTRODE MATERIAL OF LITHIUM-ION BATTERY AND PREPARATION METHOD THEREFOR

TECHNICAL FIELD

The present disclosure relates to lithium ion batteries, more particularly to a positive electrode material for a lithium ion battery and a method for preparing the same.

BACKGROUND

Lithium ion batteries are a type of secondary battery and have advantages such as high specific energy, high cell voltage, long cycle life, and the like. They have been widely used in fields such as mobile phones, laptops, and the like. The various components of a lithium ion battery, mainly including positive electrode materials, separators, electrolytes and negative electrode materials, have their own functions. The electrode materials are key components of a battery, which may determine the generation of electrical energy. Compared with negative electrode materials, positive electrode materials are the most important factor affecting battery performances. They may directly determine the capacity and cycle performance of a lithium ion battery. It is necessary to develop more optimized positive electrode materials to match the demand on further improving the safety and specific energy of a battery.

Ternary materials have been proposed as positive electrode materials for batteries. The ternary material may have a formula of $LiNi_xCo_yM_{1-x-y}O_2$ (wherein M is Mn or Al). They may be divided into NCM and NCA according to the different types of the metal M. They have become one of the mainstream choices for positive electrode materials and have been widely developed and applied.

However, the ternary materials may suffer from some potential disadvantages, including poor cycle performance and more severe gas production. Generally, used as positive electrode materials in batteries are secondary particles of ternary materials which are composed of a plurality of primary particles of the ternary materials. The positive electrode material which contains ternary materials may contact with electrolyte. During the charging of the battery, the ternary materials in the positive electrode material may undergo side reactions with electrolyte, such as the dissolution of metal ions. Side reactions can indirectly lead to a decrease in the particle strength of the positive electrode material, with cracks gradually increasing and expanding in the primary particles or at the interface thereof, and even breakage of the particles of the positive electrode material. It in turn may expose more surfaces of the positive electrode material to electrolyte, causing more side reactions. Accordingly, it may form a vicious cycle. Correspondingly, battery performances, especially cycle performance, are adversely affected.

To solve those problems, the currently proposed improving measures mainly include controlling particle size and structural morphology, coating, doping, monocrystallization, and the like. For example, doping can enhance the strength of particles of ternary materials per se. Coating can limit the contact of electrolyte with ternary materials.

The development of new energy electric vehicles and large capacity energy storage systems is driving the development of secondary batteries with further improvement in performances. Therefore, there is still a demand on developing positive electrode materials with further improvements to enhance cycle performance of a battery.

SUMMARY OF THE INVENTION

In order to improve the cycle performance of a battery, the present disclosure provides a positive electrode material with an intrinsic specific surface area and an intrinsic pore size within the required ranges. The positive electrode material in accordance with the present disclosure has excellent particle strength, excellent Li ion transference ability, and good resistance to electrolyte erosion. When used in lithium batteries, it may impart the batteries with excellent rate performance and cycle performance. The present disclosure also relates to a method for preparing the positive electrode material.

In the first aspect, provided in the present disclosure is a positive electrode material having an intrinsic specific surface area of 5-13 $m^2/g$.

As used in the present disclosure, the term "intrinsic specific surface area" refers to the BET specific surface area measured after the tested material undergoes an extreme water washing. In particular, the particles of the tested material are added to deionized water at a solid-liquid weight ratio of 1:40 at room temperature, and washed for 30 minutes at a stirring rate of 500 rpm/min. The particles of the tested material after water washing are subjected to BET specific surface area testing, to obtain their BET specific surface area, regarded as the "specific surface area after water washing". The above water washing and BET specific surface area testing are repeated until adjacent two "specific surface areas after water washing" basically do not change (for example, the difference between the two is not more than 5%, preferably not more than 2%, more preferably not more than 1%, more preferably not more than 0.5%, most preferably not more than 0.1%). Then, the last measured "specific surface area after water washing" is the "intrinsic specific surface area" of the positive electrode material.

In the second aspect, provided in the present disclosure is a method for preparing the above positive electrode material, comprising:
  subjecting a precursor of the positive electrode material to lithiating by:
  mixing the precursor with a lithium source; and
  subjecting to programmed calcining under an oxygen atmosphere, wherein the programmed calcining comprises:
  subjecting to a first calcining at 300-500° C. to obtain the first calcined product; and
  subjecting to a second calcining to obtain the second calcined product,
  wherein, in the second calcining, the calcining temperature T and the Ni content in the nickel cobalt manganese active material follow the equation:

$$670+(1-x)*500 \leq T \leq 780+(1-x)*500,$$

wherein $0.3 \leq x \leq 0.99$.

In the third aspect, provided in the present disclosure is a use of the above positive electrode material in lithium barriers.

In the fourth aspect, provided in the present disclosure is a positive electrode for a lithium battery, comprising the above positive electrode material.

In the fifth aspect, provided in the present disclosure is a lithium battery, comprising a positive electrode, a negative electrode and a separator therebetween, wherein the positive electrode comprises the above positive electrode material.

The intrinsic specific surface area and intrinsic pore size of the above positive electrode material are measured after removing free substances on the surface of the tested material and even some substances inside the tested material via the extreme water washing. Upon the intrinsic specific surface area and intrinsic pore size being within the required ranges, it indicates that, even after prolonged battery cycling, the positive electrode material in accordance with the present disclosure may still have controlled pore configuration. This means that, even after prolonged operation, the positive electrode material in accordance with the present disclosure can still provide a transference path with suitable length for transferring lithium ions, avoiding loss in capacity and rate performance caused by long transference paths. At the same time, a certain ability to resist electrolyte erosion is kept, avoiding a large number of side reactions.

The lithium battery using the positive electrode material may have a discharge capacity of up to 223.8 mAh/g at a rate of 0.1 C and a capacity retention of up to 93.6% after 80 cycles at a rate of 1 C.

BRIEF DESCRIPTION OF THE DRAWINGS

The accompanying drawings in the disclosure are only intended to illustrate selected embodiments rather than all possible embodiments and are not intended to limit the scope of the disclosure.

DETAILED DESCRIPTION

Figure 1:
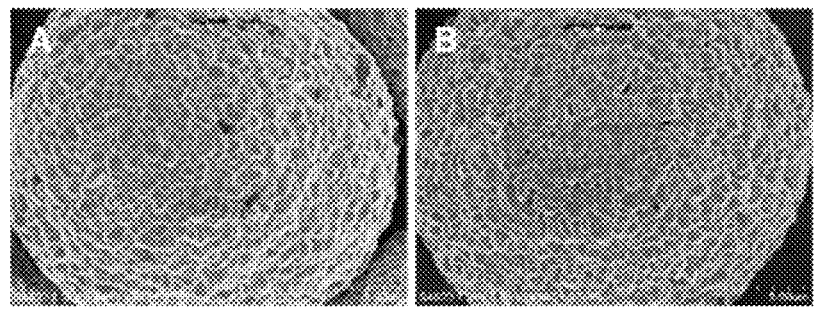
FIG. 1 is a schematic view showing SEM images of the positive electrode material P1 obtained in Example 1-1 before and after the extreme water washing.

In this specification, except the examples, all numerical values of parameters are to be understood as being modified in all instances by the term "about" whether or not "about" actually appears before the numerical value.

Unless otherwise indicated, the terms used herein have the same meaning as commonly understood by those persons skilled in the art; and if the terms are defined herein and their definitions are different from the ordinary understanding in the art, the definition provided herein shall prevail.

In one aspect, provided in the present disclosure is a positive electrode material, wherein the doped nickel cobalt manganese active material has an intrinsic specific surface area of 5-13 m²/g.

In a preferred embodiment, the positive electrode material has an intrinsic pore size which meets the following equations:

2.1 nm≤$R_{10}$≤2.5 nm, 23.0 nm≤$R_{50}$≤27.0 nm and 100.0 nm≤$R_{90}$≤160.0 nm.

The positive electrode material in accordance with the present disclosure is in a form of particles. The properties of particles may be characterized with BET specific surface area testing. The BET specific surface area testing may be used to measure specific surface area (BET specific surface area), pore volume, pore size distribution, and nitrogen adsorption and desorption curve of particles. BET specific surface area refers to the total area per unit mass of material.

As used in the present disclosure, the term "intrinsic specific surface area" refers to the BET specific surface area measured after the tested material undergoes an extreme water washing. In particular, the particles of the tested material are added to deionized water at a solid-liquid weight ratio of 1:40 at room temperature, and washed for 30 minutes at a stirring rate of 500 rpm/min. The particles of the tested material after water washing are subjected to BET specific surface area testing, to obtain their BET specific surface area, regarded as the "specific surface area after water washing". The above water washing and BET specific surface area testing are repeated until adjacent two "specific surface areas after water washing" basically do not change (for example, the difference between the two is not more than 5%, preferably not more than 2%, more preferably not more than 1%, more preferably not more than 0.5%, most preferably not more than 0.1%). Then, the last measured "specific surface area after water washing" is the "intrinsic specific surface area" of the positive electrode material.

Correspondingly, as used in the present disclosure, the term "intrinsic pore size" refers to the values of the pore size of each pore in the particles measured after the positive electrode material undergoes an extreme water washing. R10, R50 and R90 corresponding to the values of the pore size are used to characterize the "intrinsic pore size" of the positive electrode material. The values of the pore size are listed from small to large. Then, the pore sizes located at the 10%, 50% and 90% positions corresponding to all values are R10, R50 and R90, respectively.

The intrinsic specific surface area and the intrinsic pore size are measured after removing free substances on the surface of the tested material and even some substances inside the tested material via the extreme water washing. When in a battery, the tested material (the positive electrode material) may contact with electrolyte, which may lead to similar extraction of substances. Therefore, the extreme water washing can be regarded as a simulation of long-term operation of positive electrode materials. In this regard, the intrinsic specific surface area and the intrinsic pore size may truly reflect the properties of the tested material after long-term cycling, especially the particle strength and the binding strength of Li ions therein. The positive electrode material in accordance with the present disclosure has an intrinsic specific surface area and an intrinsic pore size within the required ranges, indicating that, even after prolonged battery cycling, the positive electrode material in accordance with the present disclosure may still have controlled pore configuration. This means that, even after prolonged operation, the positive electrode material in accordance with the present disclosure can still provide a transference path with suitable length for transferring lithium ions, avoiding loss in capacity and rate performance caused by long transference paths. At the same time, a certain ability to resist electrolyte erosion is kept, avoiding a large number of side reactions.

In a preferred embodiment, the positive electrode material has $D_{50}$ of 7.8-14.2 nm.

In a preferred embodiment, the positive electrode material has a compacted density of 2.0-3.8 g/cm³.

In one embodiment, the specific surface area of the positive electrode material is measured after being compressed. In particular, the positive electrode material is compressed under a pressure i, ground and sieved. The specific surface area of the positive electrode material through the sieve is tested. $SSA_i$ is the specific surface area of the positive electrode material after compressing, and $SSA_0$ is the specific surface area of the positive electrode material before compressing. The increase rate in the specific surface area is calculated using the formula $\Delta SSA_i = (SSA_i - SSA_0)/SSA_0$.

In a preferred embodiment, when the compressing pressure i is 1.5 tons, the positive electrode material after compressing may have an increase rate in the specific surface area $\Delta SSA_{1.5}$ of not more than 15%;

or, when the compressing pressure i is 2.5 tons, the positive electrode material after compressing may have an increase rate in the specific surface area $\Delta SSA_{2.5}$ of not more than 40%;

or, when the compressing pressure i is 3.5 tons, the positive electrode material after compressing may have an increase rate in the specific surface area $\Delta SSA_{3.5}$ of not more than 60%;

or, when the compressing pressure i is 4.5 tons, the positive electrode material after compressing may have an increase rate in the specific surface area $\Delta SSA_{4.5}$ of not more than 100%.

In a preferred embodiment, the positive electrode material may comprise a doped nickel cobalt manganese active material and optionally a coating layer on at least part of the surface thereof. In one embodiment, the nickel cobalt manganese active material in the doped nickel cobalt manganese active material may have a formula of $LiNi_xCo_yMn_zO_2$, where $0.3 \le x \le 0.99$, $0.01 \le y \le 0.5$, $0.01 \le z \le 0.5$, and the values of x, y and z make the algebraic sum of the valence of all elements in the formula zero, wherein dopants of the doped nickel cobalt manganese active material may comprise a first dopant element M, which is at least one selected from a group consisting of Al and Zr; a second dopant element G, which is at least one selected from a group consisting of Y, Ti, Nb, Cr, Er and Mg; and a third dopant element T, which is at least one selected from a group consisting of Ba, V, Sr, Ta, Mo, W and Ce. In one embodiment, the coating layer comprises at least one oxide selected from a group consisting of $B_2O_3$, $Al_2O_3$, $SiO_2$ and $W_2O_5$.

The positive electrode material in accordance with the present disclosure is obtained by subjecting the nickel cobalt manganese active material to doping and lithiating, which involve the step of programmed calcining, to obtain higher particle strength. Without intending to be bond to any theory, it is believed that dopant elements may be partially incorporated into the skeleton of the particles, stabilizing the lattice structure and thereby increasing the strength of the particles. At the same time, if there is a coating layer, it can inhibit or alleviate the interfacial reaction between the positive electrode material and electrolyte, thereby inhibiting or alleviating the corrosion of the positive electrode material by electrolyte. More importantly, the doped nickel cobalt manganese active material forms the skeleton of the positive electrode material. It makes the positive electrode material in accordance with the present disclosure have an intrinsic specific surface area and an intrinsic pore size within the required ranges. Accordingly, even after multiple battery cyclings, controlled pore configuration may be maintained. Such positive electrode material may have the characteristics of good rate performance and good cycling stability.

In a preferred embodiment, in the formula of the nickel cobalt manganese active material, $0.6 \le x \le 0.94$, $0.03 \le y \le 0.2$, $0.03 \le z \le 0.2$.

In one embodiment, the doped nickel cobalt manganese active material may have a formula of $Li_{1+a}(Ni_xCo_yMn_zM_dG_eT_f)O_2$, wherein $0 \le a \le 0.1$, $0.3 \le x \le 0.99$, $0.01 \le y \le 0.5$, $0.01 \le z \le 0.5$, $0 \le d \le 0.08$, $0 \le e \le 0.05$, $0 \le f \le 0.03$, $1 \le e/f \le 5$, and $x+y+z+d+e+f=1$.

In another aspect, provided in the present disclosure is a method for preparing the above positive electrode material, comprising:
  subjecting a precursor of the positive electrode material to lithiating by:
  mixing the precursor with a lithium source; and
  subjecting to programmed calcining under an oxygen atmosphere, wherein the programmed calcining comprises:
  subjecting to a first calcining at 300-500° C. to obtain the first calcined product; and
  subjecting to a second calcining to obtain the second calcined product,
  wherein, in the second calcining, the calcining temperature T and the Ni content in the nickel cobalt manganese active material follow the equation:

$$670+(1-x)*500 \le T \le 780+(1-x)*500,$$

wherein $0.3 \le x \le 0.99$.

In one embodiment, the method for preparing the above positive electrode material may comprise:
  (1) co-deposing nickel salts, cobalt salts and manganese salts, to form a precursor of the nickel cobalt manganese active materials;
  (2) subjecting the precursor of the nickel cobalt manganese active materials to doping and lithiating by:
  mixing the precursor of the nickel cobalt manganese active materials with a lithium source, a first dopant containing a first dopant element, a second dopant containing a second dopant element and a third dopant containing a third dopant element; and
  subjecting to programmed calcining under an oxygen atmosphere, wherein the programmed calcining comprises:
  subjecting to a first calcining at 300-500° C. to obtain the first calcined product; and
  subjecting to a second calcining to obtain the second calcined product,
  wherein, in the second calcining, the calcining temperature T and the Ni content in the nickel cobalt manganese active material follow the equation:

$$670+(1-x)*500 \le T \le 780+(1-x)*500,$$

wherein $0.3 \le x \le 0.99$; and
  (3) providing a coating layer on at least part of the surface of the second calcined product.

The nickel salts, cobalt salts and manganese salts may be those nickel salts, cobalt salts and manganese salts commonly used in the field for preparing positive electrode materials for lithium batteries or their precursors. As non-exclusive examples, the nickel salts, cobalt salts and manganese salts may be at least one selected from a group consisting of sulfates, nitrates, acetates, chlorides and oxalates of nickel, cobalt and manganese, respectively. For example, the nickel salts may be at least one selected from a group consisting of nickel sulfate, nickel nitrate, nickel acetate, nickel oxalate and nickel chloride; the cobalt salts may be at least one selected from a group consisting of cobalt nitrate, cobalt chloride, cobalt acetate and cobalt sulfate; and the manganese salts may be at least one selected from a group consisting of manganese sulfate, manganese nitrate, manganese acetate and manganese chloride.

In one embodiment, the nickel salts, cobalt salts and manganese salts are used in a form of solution. Based on the corresponding metal elements, the solution may have a concentration of 0.01-5 mol/L, preferably 0.5-3 mol/L, more preferably 1-2 mol/L, for example, 0.01 mol/L, 0.1 mol/L, 0.5 mol/L, 1 mol/L, 2 mol/L, 3 mol/L, 4 mol/L and 5 mol/L.

The co-deposing may be operated in the presence of a solution of precipitants and a solution of complexing agents. Preferably, the co-deposing may be operated in a continuous manner.

In one embodiment, the precipitants may be at least one selected from a group consisting of NaOH, KOH and LiOH. Preferably, the solution of precipitants may have a concentration of 0.02-10 mol/L, for example, 0.05 mol/L, 0.1 mol/L, 0.5 mol/L, about 1 mol/L, 5 mol/L or 10 mol/L.

The complexing agents may be any compound capable of forming a complex with Ni, Co, and Mn from the nickel salts, cobalt salts and manganese salts in an aqueous solution. In one embodiment, the complexing agents may be at least one selected from a group consisting of ammonium ion donors, ethanolamine based complexing agents, and carboxylate based complexing agents. Preferably, the complexing agents are ammonium ion donors, preferably at least one selected from a group consisting of ammonia, ammonium oxalate, ammonium carbonate and ammonium hydroxide, more preferably ammonia. In one variant, the solution of complexing agents may have a concentration of 0.01-15 mol/L, for example, 0.01 mol/L, 0.1 mol/L, 0.5 mol/L, 1 mol/L, 5 mol/L, 10 mol/L or 15 mol/L.

In one embodiment, the solution of the nickel salts, cobalt salts and manganese salts, the solution of precipitants and the solution of complexing agents are continuously fed into the reaction system, respectively, wherein the nickel salts, cobalt salts and manganese salts are in a molar ratio of x:y:z, wherein x, y and z are as defined above. The co-deposing may be operated under conditions of, for example, a temperature of 50-90° C., preferably 60-80° C.; a pH of 9-13, preferably 10-12, and the solution of complexing agents in a concentration of 2-8 g/L. The feed rates for the solution of the nickel salts, cobalt salts and manganese salts, the solution of precipitants and the solution of complexing agents may be selected in a wide range, as long as the feed rates may meet the requirements of maintaining pH of the reaction system within the predetermined range. Preferably, the co-deposing may be operated under stirring. Preferably, the stirring speed is about 100-1000 r/min, and preferably about 400-800 r/min; for example, 100 r/min, 200 r/min, 300 r/min, 400 r/min, 500 r/min, 600 r/min, 700 r/min or 800 r/min.

The product of the co-deposing may be subjected to aging, separating, washing and drying, to obtain the precursor of the nickel cobalt manganese active materials. Relating operations can be carried out in any conventional manner in the art.

The precursor of the nickel cobalt manganese active materials obtained in the step of co-deposing may be subjected to doping and lithiating, comprising mixing the precursor of the nickel cobalt manganese active materials with a lithium source, a first dopant containing a first dopant element, a second dopant containing a second dopant element, and a third dopant containing a third dopant element; and subjecting to programmed calcining.

The lithium source may be at least one selected from a group consisting of lithium nitrate, lithium chloride, lithium carbonate, lithium hydroxide and lithium acetate. The first dopant containing the first dopant element may be oxides of the first dopant element, or salts of the first dopant element that can be converted into oxides of the first dopant element under the second calcining condition. The salts of the first dopant element may be at least one selected from a group consisting of sulfates, nitrates, acetates, chlorides and oxalates of the first dopant element. The second dopant containing the second dopant element may be oxides of the second dopant element, or salts of the second dopant element that can be converted into oxides of the second dopant element under the second calcining condition. The salts of the second dopant element may be at least one selected from a group consisting of sulfates, nitrates, acetates, chlorides and oxalates of the second dopant element. The third dopant containing the third dopant element may be oxides of the third dopant element, or salts of the third dopant element that can be converted into oxides of the third dopant element under the second calcining condition. The salts of the third dopant element may be at least one selected from a group consisting of sulfates, nitrates, acetates, chlorides and oxalates of the third dopant element. The lithium source, the first dopant, the second dopant and the third dopant may be used in a molar ratio of $(1+a):d:e:f$, where a, d, e, and f are defined above.

In the step of doping and lithiating, the mixing may be operated by ball milling, shearing, grinding, blending and the like. Preferably, the mixing may be operated for 1-4 hours.

Then, the mixture after the mixing may be subjected to programmed calcining. The programmed calcining may be operated under an oxygen atmosphere. The oxygen atmosphere may be formed by introducing oxygen, where the flow rate Q of oxygen may be 1-2 $m^3/kg \cdot h$.

In one embodiment, the programmed calcining comprises: subjecting to a first calcining at 300-500° C. to obtain the first calcined product; and subjecting to a second calcining at the calcining temperature T to obtain the second calcined product. Preferably, the first calcining may be operated at a temperature of 300-500° C., preferably 350-450° C., for example, at a temperature of 300° C., 350° C., 400° C., 450° C. or 500° C., for 1-10 hours, preferably 4-8 hours, for example 1 h, 2 h, 3 h, 4 h, 5 h, 6 h, 7 h or 8 h.

Preferably, in the second calcining, the calcining temperature T may be: $670+(1-x)*500$ to $780+(1-x)*500°$ C.; preferably, $690+(1-x)*500$ to $770+(1-x)*500°$ C.; for example, $700+(1-x)*500°$ C., $710+(1-x)*500°$ C., $720+(1-x)*500°$ C., $730+(1-x)*500°$ C., $740+(1-x)*500°$ C., $750+(1-x)*500°$ C. or $760+(1-x)*500°$ C., wherein x is the Ni content in the nickel cobalt manganese active materials, and $0.3 \leq x \leq 0.99$, as defined above.

In one embodiment, the flow rate Q of oxygen (in $m^3/kg \cdot h$) and the second calcining time t (in hour) may satisfy the relationship of $-13.17 \ln(Q)+14.54 \leq t \leq -13.17 \ln(Q)+16.54$. Preferably, $-13.17 \ln(Q)+14.54 \leq t \leq -13.17 \ln(Q)+16.54$. For example, $t=-13.17 \ln(Q)+15$, $t=-13.17 \ln(Q)+15.5$, $t=-13.17 \ln(Q)+16$ or $t=-13.17 \ln(Q)+16.5$.

The second calcining mainly results in the oxidation of divalent nickel. Accordingly, if the calcining time is too short, it may lead to insufficient oxidation reaction, resulting in an excessive amount of divalent nickel. Accordingly, it may result in severe Li/Ni disordering and thereby a decrease in performances of the obtained positive electrode material. If the calcining time is too long, it may lead to a large degree of crystallization. Accordingly, it may result in poor cycle performance of the obtained positive electrode material and an increase in cost. In this regard, an appropriate calcining time shall be determined based on the flow rate of oxygen during the calcining. Consequently, it may control the oxidation of divalent nickel, reduce the content of divalent nickel in the Li layer, inhibit Li/Ni disordering, and avoid excessive crystallization in the positive electrode material. Ultimately, the charging and discharging capacity, rate performance, and cycle performance of lithium-ion batteries containing the positive electrode material may be improved.

The first calcining may be operated at a constant temperature or a variable temperature. For example, the first calcining may be composed of maintaining at a temperature selected from 300 to 500° C. for 1-10 hours, preferably 4-8 hours. Alternatively, the first calcining may comprise heating and cooling between two or more temperatures selected from 300 to 500° C. (for example, heating and cooling at a constant rate, preferably at a rate of 1-10° C./min, such as 1° C./min, 2° C./min, 4° C./min, 5° C./min, 7° C./min or 10° C./min), for a total time of 1-10 hours, preferably 4-8 hours. In a variant, there may be a step of maintaining at the temperature between the heating and cooling.

The second calcining may be operated at a constant temperature or a variable temperature. For example, the second calcining may be operated at a calcining temperature T selected from $670+(1-x)*500$ to $780+(1-x)*50\ 0°$ C., at a flow rate of oxygen Q, for a time t (in hour) of $-13.17\ \ln(Q)+14.54$ to $-13.17\ \ln(Q)+16.54$. Alternatively, the second calcining may comprise heating and cooling between two or more temperatures selected from $670+(1-x)*500$ to $780+(1-x)*500°$ C. (for example, heating and cooling at a constant rate, preferably at a rate of 1-10° C./min, such as 1° C./min, 2° C./min, 4° C./min, 5° C./min, 7° C./min or 10° C./min), for a total time t (in hour) of $-13.17\ \ln(Q)+14.54$ to $-13.17\ \ln(Q)+16.54$. In a variant, there may be a step of maintaining at the temperature between the heating and cooling.

There is no special limitation in the present disclosure on the rate for heating to the required temperature for the first and second calcining. Preferably, the rate may be 1-10° C./min, for example 1° C./min, 2° C./min, 4° C./min, 5° C./min, 7° C./min or 10° C./min.

After the second calcining, cooling may be operated, for example, cooling naturally to room temperature. The second calcined product is the doped nickel cobalt manganese active material mentioned above.

In one embodiment, a coating layer is provided on at least part of the surface of the second calcined product. The coating layer may comprise at least one oxide selected from a group consisting of $B_2O_3$, $Al_2O_3$, $SiO_2$ and $W_2O_5$. The providing of the coating layer may comprise mixing the second calcined product with a coating agent, and subjecting to a third calcining at 250-500° C. In providing of the coating layer, the mixing may be operated by ball milling, shearing, grinding, blending and the like. The second calcined product and the coating agent are mixed in a molar ratio of, for example, 1:0.01-0.1. Preferably, the mixing may be operated for 1-4 hours. The coating agent may be a material that can be converted into the coating layer under the conditions of the third calcining. It may include, for example, boric acid, aluminum hydroxide, pseudo boehmite, boehmite, gibbsite, bayerite, silicic acid, orthosilicic acid or ammonium paratungstate.

The third calcining may be operated at a constant temperature or a variable temperature. For example, the third calcining may be composed of maintaining at a temperature selected from 250 to 500° C., for 1-24 hours, preferably 6-12 hours. Alternatively, the third calcining may comprise heating and cooling between two or more temperatures selected from 300 to 500° C. (for example, heating and cooling at a constant rate, preferably at a rate of 1-10° C./min, such as 1° C./min, 2° C./min, 4° C./min, 5° C./min, 7° C./min or 10° C./min), for a total time of 1-24 hours, preferably 6-12 hours. In a variant, there may be a step of maintaining at the temperature between the heating and cooling. There is no special limitation on the rate for heating to the required temperature for the third calcining. Preferably, the rate may be 1-10° C./min, for example 1° C./min, 2° C./min, 4° C./min, 5° C./min, 7° C./min or 10° C./min.

The third calcined product is the positive electrode material in accordance with the present disclosure. Optionally, the third calcined product may be subjected to cooling, sieving and removing iron impurities.

The inventor of the present application surprisingly found during the research that, when a positive electrode material is incorporated with a plurality of dopant elements and subjected to programmed calcining during its preparation, the obtained positive electrode material may have a stable lattice structure and improved particle strength. The positive electrode material may impart lithium batteries with better electrochemical performances, such as improved rate performance and cycling stability.

The positive electrode material in accordance with the present disclosure may be used in secondary batteries, such as lithium ion batteries. Lithium ion batteries may comprise a negative electrode, a positive electrode, a separator and an electrolyte.

The positive electrode includes a positive electrode material layer on the positive current collector, wherein the positive electrode material layer comprises the positive electrode material in accordance with the present disclosure. The positive electrode material layer may further comprise a binder and a conductive agent. The binder may be resin materials selected from a group consisting of polyvinylidene fluoride (PVDF), polytetrafluoroethylene (PTFE), polyacrylonitrile (PAN), styrene butadiene rubber (SBR), carboxymethyl cellulose (CMC) and the like. The conductive agent may include carbon-based materials or conductive polymers. The carbon-based materials may comprise, for example, graphite, acetylene black, carbon fibers, nanotubes, graphene and carbon black. The conductive polymers may include polyaniline, polythiophene, polyacetylene, polypyrrole and the like. The current collector may include at least one of stainless steel, aluminum, nickel, iron, titanium, copper, tin, or any other conductive materials known to those persons skilled in the art. In some variants, the current collector may be precoated, such as carbon coated aluminum foil.

There is no specific limitation on the composition of the negative electrode in the present disclosure. It may be a negative electrode commonly used in the art, such as a lithium metal sheet.

There is no specific limitation on the composition of the separator in the present disclosure. It may be a separator commonly used in the art. For example, the separator may be a porous membrane made of polyolefins such as polytetrafluoroethylene, polypropylene or polyethylene.

The electrolyte may be various conventional electrolytes, such as non-aqueous electrolyte. The non-aqueous electrolyte is a solution formed by an electrolyte lithium salt in a non-aqueous solvent. Any traditional non-aqueous electrolyte known to those persons skilled in the art may be used. For example, the electrolyte may be at least one selected from a group consisting of lithium hexafluorophosphate ($LiPF_6$), lithium perchlorate ($LiClO_4$), lithium tetrafluoroborate ($LiBF_4$), lithium hexafluoroarsenate ($LiAsF_6$) and lithium hexafluorosilicate ($LiSiF_6$). The non-aqueous solvent may be selected from a group consisting of linear esters, cyclic esters and mixtures thereof. The linear esters may be at least one selected from a group consisting of dimethyl carbonate (DMC), diethyl carbonate (DEC), methyl ethyl carbonate (EMC), methyl propyl carbonate (MPC) and dipropyl carbonate (DPC). The cyclic esters may be at least one selected from a group consisting of ethylene carbonate (EC), propylene carbonate (PC) and vinylene carbonate (VC).

EXAMPLES

The features and advantages of the present invention are apparent from the following examples. The examples are intended to illustrate and not to limit the invention in any way.

Testing.

1. Testing for BET specific surface area and pore size.

The BET specific surface area testing was operated with a Tristar II 3020 analyzer from Micromeritics, US. The sample was pretreated at conditions of a temperature of 300° C. and a degassing time of 1 hour. The BET specific surface area and the pore size of the sample were calculated according to the BET equation.

2. Testing for the change in specific surface area under pressure.

3 g of the sample was subjected to pressures of 0 tons, 1.5 tons, 2.5 tons, 3.5 tons and 4.5 tons respectively to obtain the compressed samples. The above testing for BET specific surface area was repeated with each of the compressed samples, to obtain specific surface area data under different pressures, for use in characterizing the change in specific surface area under pressure.

3. Testing for battery performances.

3.1 Preparation of battery samples:

The obtained positive electrode material, conductive carbon black and polyvinylidene fluoride (PVDF) were mixed in a mass ratio of 95%:2.5%:2.5%. To the mixture, N-methylpyrrolidone (NMP) was added under stirring, to form a uniform slurry. The slurry was coated on an aluminum foil, blade smoothed, dried, rolled flat, stamped under a pressure of 100 MPa into a positive electrode plate with a diameter of 12 mm and a thickness of 120 μm, and then dried in a vacuum drying oven at 120° C. for 12 hours.

A coin cell was assembled in a glovebox under an Ar protection atmosphere, in which the water content and oxygen content were both controlled to less than 5 ppm. The electrode plate obtained above was used as the positive electrode. A Li metal sheet with a diameter of 17 mm and a thickness of 1 mm was used as the negative electrode. A porous film of polyethylene with a thickness of 25 μm was used as the separator. A solution of 1.0 mol/L LiPF$_6$ dissolved in a mixture of ethylene carbonate (EC) and diethyl carbonate (DEC) in a volume ratio of 1:1 was used as the electrolyte. A battery shell for a 2025 coin cell was used as the battery shell. After the assembling, an inactivated half-cell was obtained.

3.2 Performance evaluation of the battery samples:

(1) Initial Cycling Efficiency

The assembled lithium-ion battery samples were tested at room temperature (25° C.) at a current density of 0.1 C (1 C=200 mA/g), to obtain the values of the specific charging capacity and the specific discharging capacity at the first cycling. The initial cycling efficiency was calculated as a ratio of the specific discharging capacity at the first cycling to the specific charging capacity at the first cycling.

(2) Cycle performance.

Activation of Batteries:

The coin battery sample obtained after the assembly was set for 2 hours. After the open circuit voltage was stabilized, it was charged at a constant current density of 0.1 C to a cut-off voltage of 4.3 V, charged at a constant voltage for 30 minutes, and then discharged at a constant current of 0.1 C to a cut-off voltage of 3.0 V. Subsequently, the battery was charged and discharged once more in the same way, to be activated.

The activated battery samples were subjected to a specified number of charge and discharge cycles, such as 80 cycles, at a current density of 1 C, a voltage range of 3.0-4.3 V and a temperature of 45° C. The specific discharge capacity at each cycle was obtained for calculating capacity retention. The capacity retention=the specific discharge capacity at the specified cycle/the initial specific discharge capacity*100%.

(3) Rate Performance.

The activated battery samples were subjected to charge and discharge cycles at current rates of 0.1 C, 0.2 C, 0.33 C, 0.5 C and 1 C respectively, at a voltage range of 3.0-4.3 V and room temperature, to obtain the specific discharge capacity at different rates.

(4) Lithium Ion Transference Number.

The lithium ion transference number was tested by EIS testing. In particular, the inactivated battery sample was set for 2 hours, charged at a constant current density of 0.1 C to a cut-off voltage of 4.3 V, charged at a constant voltage for 30 minutes, discharged at a constant current of 0.1 C to a cut-off voltage of 3.0 V, and then charged at a constant current density of 0.1 C to a cut-off voltage of 4.3 V, to obtain a fully charged battery sample. It was subjected to EIS testing at a frequency range of 100 kHz to 0.01 Hz, with an amplitude of 10 mV. According to the following equation, a slope, i.e. σ, of the fitted line of Zre to ω-½ was obtained:

$$Zre = Rs + Rct + \sigma\omega - ½, \text{ and}$$

$$\omega = 2\pi f,$$

wherein, Zre was the real part of the impedance pattern obtained from the test, Rs is the solution resistance, and Rct is the resistance to charge transferring, ω is the angular frequency, f is the testing frequency, σ is the Warburg factor;

Li+ diffusion coefficient in the bulk of the materials was calculated according to the following Lithium Ion Diffusion Coefficient Calculation formula:

$$D_{Li+} = R^2 T^2 / (2A^2 n^4 F^4 C^2 \sigma^2)$$

wherein R is the ideal gas constant, T is the absolute temperature, A is the cross-sectional area of the electrode, n is the electron transfer number, F is the Faraday constant, and C is the concentration of lithium ion in the electrode.

Example 1-1

(1) The Preparation of a Precursor of the Nickel Cobalt Manganese Active Materials.

Nickel sulfate, cobalt sulfate and manganese sulfate were dissolved in water in a molar ratio of 90:6:4 to form a 2 mol/L solution of mixed salts. A 8 mol/L solution of sodium hydroxide was used as the solution of precipitants. A 6 mol/L solution of ammonia was used as the solution of complexing agents. The solution of mixed salts, the solution of precipitants and the solution of complexing agents were fed into an autoclave respectively, with their feeding rates being controlled to achieve a reaction temperature of 60° C., pH of 11.3, and an ammonia concentration of 6 g/L. Co-deposing was operated at a stirring speed of 600 rpm. After 80 hours of the reaction, obtained was a precursor of the nickel cobalt manganese active materials. The precursor of the nickel cobalt manganese active materials was subjected to aging, separating, washing and drying, then ready for use.

(2) The Preparation of a Doped Nickel Cobalt Manganese Active Material.

The above precursor of the nickel cobalt manganese active materials, lithium hydroxide as the lithium source, aluminum oxide as the first dopant, tungsten oxide as the second dopant, and strontium carbonate as the third dopant were mixed at a molar ratio of 0.99:1.03:0.007:0.002:0.001 in a mixer. The mixture was subjected to the programmed calcining in a furnace. While oxygen was introduced at a flow rate of 1.33 m³/kg-h, the mixture was heated at a constant rate for 3 hours from room temperature to 300° C. and kept at a temperature of 300° C. for 2 hours, to complete the first calcining. And then, the mixture was heated at a constant rate for 6 hours to 780° C., and kept at 780° C. for 12 hours, to complete the second calcining. Finally, the mixture was naturally cooled to room temperature, to obtain a doped nickel cobalt manganese active material. The doped nickel cobalt manganese active material was subjected to cooling, pulverizing and sieving, then ready for use.

(3) The Preparation of a Positive Electrode Material.

The doped nickel cobalt manganese active material and boric acid as the coating agent were mixed in a molar ratio of 1:0.01 in a high-speed mixer. The mixture was subjected to a third calcining in a furnace, at 350° C. for 10 hours, to obtain the positive electrode material P1, which had a formula of $Li_{1.03}(Ni_{0.896}Co_{0.057}Mn_{0.037}Al_{0.007}Zr_{0.002}Sr_{0.001})O_2/B_2O_3$. The positive electrode material P1 was subjected to cooling, sieving and removing iron impurities, then ready for use.

As mentioned above, the obtained positive electrode material P1 was subjected to extreme water washing and testing for its intrinsic specific surface area and intrinsic pore size. The results were listed in Table 1-2.

At the same time, the obtained positive electrode material P1 was subjected to extreme water washing, as well as SEM and XRD testing. The results were shown in FIG. 1 and FIG. 2, respectively.

FIG. 1 was a schematic view showing SEM images of the positive electrode material P1 obtained in Example 1-1 before and after the extreme water washing, wherein A was the SEM image before the extreme water washing and B was the SEM image after the extreme water washing. As shown in FIG. 1, there was little difference in the SEM images of the positive electrode material P1 in Example 1-1 before and after extreme water washing, indicating that the extreme water washing did not have a significant impact on the structure of the positive electrode material P1 in Example 1-1.

Figure 2:
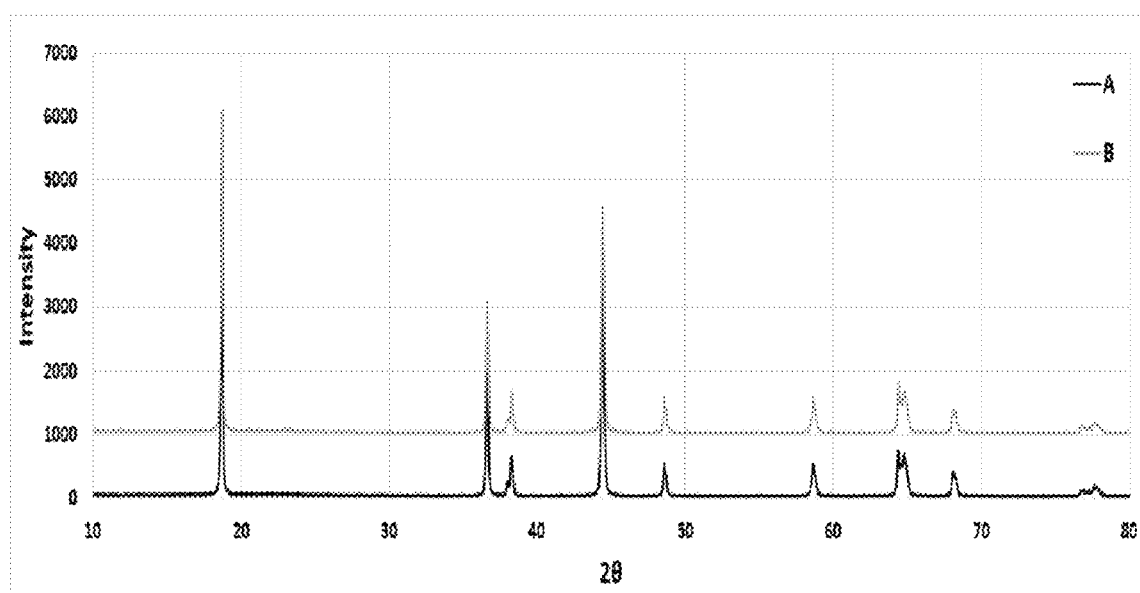
FIG. 2 is a schematic view showing XRD patterns of the positive electrode material P1 obtained in Example 1-1 before and after the extreme water washing.

FIG. 2 was a schematic view showing XRD patterns of the positive electrode material P1 obtained in Example 1-1 before and after the extreme water washing, wherein A was the XRD pattern before the extreme water washing and B was the XRD pattern after the extreme water washing. As shown in FIG. 2, the XRD patterns of the positive electrode material P1 obtained in Example 1-1 before and after extreme water washing were basically the same, indicating that the extreme water washing did not have a significant impact on the structure of the positive electrode material P1 in Example 1-1. It was consistent with the results obtained from SEM images.

At the same time, as mentioned above, the obtained positive electrode material P1 was used in preparing a lithium ion battery sample, and subjected to the performance evaluation. The results were shown in Table 1-3.

Example 1-2

Example 1-1 was repeated except that the corresponding materials and process conditions in Example 1-1 were replaced with the materials and process conditions listed in Table 1-1, to obtain a positive electrode material P2.

The positive electrode material P2 had a formula of $Li_{0.03}(Ni_{0.896}Co_{0.057}Mn_{0.037}Al_{0.006}Nb_{0.003}W_{0.001})O_2/B_2O_3$.

As mentioned above, the obtained positive electrode material P2 was subjected to extreme water washing and testing for its intrinsic specific surface area and intrinsic pore size. The results were listed in Table 1-2.

As mentioned above, the obtained positive electrode material P2 was used in preparing a lithium ion battery sample, and subjected to the performance evaluation. The results were shown in Table 1-3.

Comparative Example 1-1

Example 1-1 was repeated except that the corresponding materials and process conditions in Example 1-1 were replaced with the materials and process conditions listed in Table 1-1, to obtain a positive electrode material P3.

The positive electrode material P3 had a formula of $Li_{1.03}(Ni_{0.896}Co_{0.057}Mn_{0.037}Zr_{0.005}La_{0.004}W_{0.00})O_2/B_2O_3$.

As mentioned above, the obtained positive electrode material P3 was subjected to extreme water washing and testing for its intrinsic specific surface area and intrinsic pore size. The results were listed in Table 1-2.

As mentioned above, the obtained positive electrode material P3 was used in preparing a lithium ion battery sample, and subjected to the performance evaluation. The results were shown in Table 1-3.

Comparative Example 1-2

Example 1-1 was repeated except that the corresponding materials and process conditions in Example 1-1 were replaced with the materials and process conditions listed in Table 1-1, to obtain a positive electrode material P4.

The positive electrode material P4 had a formula of $Li_{1.03}(Ni_{0.896}Co_{0.057}Mn_{0.037}Al_{0.007}Zr_{0.002}Sr_{0.001})O_2/B_2O_3$.

As mentioned above, the obtained positive electrode material P4 was subjected to extreme water washing and testing for its intrinsic specific surface area and intrinsic pore size. The results were listed in Table 1-2.

As mentioned above, the obtained positive electrode material P4 was used in preparing a lithium ion battery sample, and subjected to the performance evaluation. The results were shown in Table 1-3.

Comparative Example 1-3

Example 1-1 was repeated except that the corresponding materials and process conditions in Example 1-1 were replaced with the materials and process conditions listed in Table 1-1, to obtain a positive electrode material P5.

The positive electrode material P5 had a formula of $Li_{1.03}(Ni_{0.896}Co_{0.057}Mn_{0.037}Al_{0.007}Zr_{0.002}Sr_{0.001})O_2/B_2O_3$.

As mentioned above, the obtained positive electrode material P5 was subjected to extreme water washing and testing for its intrinsic specific surface area and intrinsic pore size. The results were listed in Table 1-2.

As mentioned above, the obtained positive electrode material P5 was used in preparing a lithium ion battery sample, and subjected to the performance evaluation. The results were shown in Table 1-3.

TABLE 1-1 summary of materials and processing conditions used in Examples and Comparative examples.

| | | Ex. 1-1 | Ex. 1-2 | CE. 1-1 | CE. 1-2 | CE. 1-3 |
|---|---|---|---|---|---|---|
| the preparation of a precursor of the nickel cobalt manganese active materials | molar ratio of NCM | 90:6:4 | 90:6:4 | 90:6:4 | 90:6:4 | 90:6:4 |
| | concentration of the solution of mixed salts | 2 mol/L | 2 mol/L | 2 mol/L | 2 mol/L | 2 mol/L |
| | precipitants | sodium hydroxide | sodium hydroxide | sodium hydroxide | sodium hydroxide | sodium hydroxide |
| | concentration of the solution of precipitants | 8 mol/L | 8 mol/L | 8 mol/L | 8 mol/L | 8 mol/L |
| | complexing agents | ammonia | ammonia | ammonia | ammonia | ammonia |
| | concentration of the solution of complexing agents | 6 mol/L | 6 mol/L | 6 mol/L | 6 mol/L | 6 mol/L |
| | ammonia concentration | 6 g/L | 6 g/L | 6 g/L | 6 g/L | 6 g/L |
| | temperature | 60° C. | 60° C. | 60° C. | 60° C. | 60° C. |
| | stirring speed | 600 rpm | 600 rpm | 600 rpm | 600 rpm | 600 rpm |
| | pH | 11.3 | 11.3 | 11.3 | 11.3 | 11.3 |
| the preparation of a doped nickel cobalt manganese active material | lithium source | lithium hydroxide | lithium hydroxide | lithium hydroxide | lithium hydroxide | lithium hydroxide |
| | first dopant | aluminum oxide | aluminum oxide | zirconium oxide | aluminum oxide | aluminum oxide |
| | second dopant | zirconium oxide | niobium oxide | lanthanum oxide | zirconium oxide | zirconium oxide |
| | third dopant | strontium carbonate | tungsten oxide | tungsten oxide | strontium carbonate | strontium carbonate |
| | amounts in molar ratio | Li/precursor/Al/Zr/Sr = 1.03:0.99:0.007:0.002:0.001 | Li/precursor/Al/Nb/W = 1.03:0.99:0.006:0.003:0.001 | Li/precursor/Zr/La/W = 1.03:0.99:0.005:0.004:0.001 | Li/precursor/Al/Zr/Sr = 1.03:0.99:0.007:0.002:0.001 | Li/precursor/Al/Zr/Sr = 1.03:0.99:0.007:0.002:0.001 |
| | temperature for the first calcining | 300° C. | 300° C. | 300° C. | 300° C. | 300° C. |
| | time for the first calcining | 2 h | 2 h | 2 h | 2 h | 2 h |
| | the second calcining temperature T | 780° C. | 780° C. | 780° C. | 670° C. | 780° C. |
| | flow rate of oxygen, Q | 1.33 m$^3$/kg · h | 1.08 m$^3$/kg · h | 1.33 m$^3$/kg · h | 1.33 m$^3$/kg · h | 1.33 m$^3$/kg · h |
| | time for the second calcining | 12 h | 14 h | 12 h | 12 h | 16 h |
| the preparation of a positive electrode material | coating agent | boric acid | boric acid | boric acid | boric acid | boric acid |
| | amounts in molar ratio | doped nickel cobalt manganese active material/coating agent = 1/0.01 | doped nickel cobalt manganese active material/coating agent = 1/0.01 | doped nickel cobalt manganese active material/coating agent = 1/0.01 | doped nickel cobalt manganese active material/coating agent = 1/0.01 | doped nickel cobalt manganese active material/coating agent = 1/0.01 |
| | temperature for the third calcining | 350° C. | 350° C. | 350° C. | 350° C. | 350° C. |
| | time for the third calcining | 12 h | 12 h | 12 h | 12 h | 12 h |

TABLE 1-2 parameters of the positive electrode materials.

| | Ex. 1-1 | Ex. 1-2 | CE. 1-1 | CE. 1-2 | CE. 1-3 |
|---|---|---|---|---|---|
| intrinsic specific surface area (m$^2$/g) | 7.7 | 8.2 | 13.5 | 3.9 | 14.5 |
| $R_{10}$ (nm) | 2.3 | 2.4 | 2.6 | 1.9 | 2.6 |
| $R_{50}$ (nm) | 23.4 | 24.9 | 28.5 | 19.9 | 29.4 |
| $R_{90}$ (nm) | 126.8 | 130.2 | 172.0 | 97.2 | 166.3 |
| $SSA_{1.5}$ (nm) | 0.42 | 0.54 | 0.58 | 0.51 | 0.61 |
| $SSA_{2.5}$ (nm) | 0.50 | 0.59 | 0.71 | 0.62 | 0.70 |
| $SSA_{3.5}$ (nm) | 0.59 | 0.65 | 0.84 | 0.73 | 0.85 |
| $SSA_{4.5}$ (nm) | 0.67 | 0.70 | 0.98 | 0.86 | 1.01 |

TABLE 1-3 performances of the positive electrode materials.

| | Ex. 1-1 | Ex. 1-2 | CE. 1-1 | CE. 1-2 | CE. 1-3 |
|---|---|---|---|---|---|
| $Li_+$ transference number (cm$^2$/g) | $8.2 \times 10^{-11}$ | $7.6 \times 10^{-11}$ | $6.3 \times 10^{-11}$ | $6.5 \times 10^{-11}$ | $4.9 \times 10^{-11}$ |
| specific discharging capacity at 0.1 C (mAh/g) | 223.8 | 224.3 | 224.4 | 221.6 | 224.1 |

TABLE 1-3-continued performances of the positive electrode materials.

| | Ex. 1-1 | Ex. 1-2 | CE. 1-1 | CE. 1-2 | CE. 1-3 |
|---|---|---|---|---|---|
| specific discharging capacity at 0.2 C (mAh/g) | 216.9 | 217.6 | 215.3 | 214.8 | 217.0 |
| specific discharging capacity at 0.33 C (mAh/g) | 212.2 | 212.7 | 211.2 | 209.9 | 211.8 |
| specific discharging capacity at 0.5 C (mAh/g) | 208.4 | 209.0 | 207.4 | 205.6 | 208.1 |
| specific discharging capacity at 1 C (mAh/g) | 201.9 | 202.6 | 200.3 | 198.5 | 200.7 |
| initial cycling efficiency (%) | 91.5 | 91.6 | 91.3 | 91.5 | 91.3 |
| capacity retention after 80 cycles (%) | 90.8 | 90.7 | 88.6 | 87.9 | 89.4 |

Example 2-1

(1) The Preparation of a Precursor of the Nickel Cobalt Manganese Active Materials.

Nickel sulfate, cobalt sulfate and manganese sulfate were dissolved in water in a molar ratio of 65:15:20 to form a 1.7 mol/L solution of mixed salts. A 8 mol/L solution of sodium hydroxide was used as the solution of precipitants. A 13 mol/L solution of ammonia was used as the solution of complexing agents. The solution of mixed salts, the solution of precipitants and the solution of complexing agents were fed into an autoclave respectively, with their feeding rates being controlled to achieve a reaction temperature of 40° C., pH of 11.6, and an ammonia concentration of 6 g/L. Co-deposing was operated at a stirring speed of 600 rpm. After 80 hours of the reaction, obtained was a precursor of the nickel cobalt manganese active materials. The precursor of the nickel cobalt manganese active materials was subjected to aging, separating, washing and drying, then ready for use.

(2) The Preparation of a Doped Nickel Cobalt Manganese Active Material.

The above precursor of the nickel cobalt manganese active materials, lithium hydroxide as the lithium source, zirconium oxide as the first dopant, yttrium oxide as the second dopant, and tungsten carbonate as the third dopant were mixed at a molar ratio of 1.05:0.99:0.006:0.002:0.002 in a mixer. The mixture was subjected to the programmed calcining in a furnace. While oxygen was introduced at a flow rate of 1.33 m³/kg·h, the mixture was heated at a constant rate for 3 hours from room temperature to 300° C. and kept at a temperature of 300° C. for 2 hours, to complete the first calcining. And then, the mixture was heated at a constant rate for 6 hours to 780° C., and kept at 780° C. for 12 hours, to complete the second calcining. Finally, the mixture was naturally cooled to room temperature, to obtain a doped nickel cobalt manganese active material. The doped nickel cobalt manganese active material was subjected to cooling, pulverizing and sieving, then ready for use.

(3) The Preparation of a Positive Electrode Material.

The doped nickel cobalt manganese active material, and boric acid and aluminum hydroxide as the coating agents were mixed in a molar ratio of 1/0.01/0.01 in a high-speed mixer. The mixture was subjected to a third calcining in a furnace, at 450° C. for 10 hours, to obtain the positive electrode material P6, which had a formula of $Li_{1.03}(Ni_{0.648}Co_{0.152}Mn_{0.200}Zr_{0.006}Y_{0.002}W_{0.002})O_2/B_2O_3+Al_2O_3$. The positive electrode material P6 was subjected to cooling, sieving and removing iron impurities, then ready for use.

As mentioned above, the obtained positive electrode material P6 was subjected to extreme water washing and testing for its intrinsic specific surface area and intrinsic pore size. The results were listed in Table 2-2.

As mentioned above, the obtained positive electrode material P6 was used in preparing a lithium ion battery sample, and subjected to the performance evaluation. The results were shown in Table 2-3.

Example 2-2

Example 2-1 was repeated except that the corresponding materials and process conditions in Example 2-1 were replaced with the materials and process conditions listed in Table 2-1, to obtain a positive electrode material P7.

The positive electrode material P7 had a formula of $Li_{1.03}(Ni_{0.648}Co_{0.152}Mn_{0.200}Nb_{0.003}Sr_{0.002})O_2/B_2O_3+Al_2O_3$.

As mentioned above, the obtained positive electrode material P7 was subjected to extreme water washing and testing for its intrinsic specific surface area and intrinsic pore size. The results were listed in Table 2-2.

As mentioned above, the obtained positive electrode material P7 was used in preparing a lithium ion battery sample, and subjected to the performance evaluation. The results were shown in Table 2-3.

Comparative Example 2-1

Example 2-1 was repeated except that the corresponding materials and process conditions in Example 2-1 were replaced with the materials and process conditions listed in Table 2-1, to obtain a positive electrode material P8.

The positive electrode material P8 had a formula of $Li_{1.03}(Ni_{0.648}Co_{0.152}Mn_{0.200}Ti_{0.005}Y_{0.004}Sr_{0.00})O_2/B_2O_3+Al_2O_3$.

As mentioned above, the obtained positive electrode material P8 was subjected to extreme water washing and testing for its intrinsic specific surface area and intrinsic pore size. The results were listed in Table 2-2.

As mentioned above, the obtained positive electrode material P8 was used in preparing a lithium ion battery sample, and subjected to the performance evaluation. The results were shown in Table 2-3.

Comparative Example 2-2

Example 2-1 was repeated except that the corresponding materials and process conditions in Example 2-1 were replaced with the materials and process conditions listed in Table 2-1, to obtain a positive electrode material P9.

The positive electrode material P9 had a formula of $Li_{1.03}(Ni_{0.648}Co_{0.152}Mn_{0.200}Zr_{0.006}Y_{0.002}W_{0.002})O_2/B_2O_3+Al_2O_3$.

As mentioned above, the obtained positive electrode material P9 was subjected to extreme water washing and testing for its intrinsic specific surface area and intrinsic pore size. The results were listed in Table 2-2.

As mentioned above, the obtained positive electrode material P9 was used in preparing a lithium ion battery sample, and subjected to the performance evaluation. The results were shown in Table 2-3.

Comparative Example 2-3

Example 2-1 was repeated except that the corresponding materials and process conditions in Example 2-1 were replaced with the materials and process conditions listed in Table 2-1, to obtain a positive electrode material P10.

The positive electrode material P10 had a formula of $Li_{1.03}(Ni_{0.648}Co_{0.152}Mn_{0.200}Zr_{0.006}Y_{0.002}W_{0.002})O_2/B_2O_3+Al_2O_3$.

As mentioned above, the obtained positive electrode material P10 was subjected to extreme water washing and testing for its intrinsic specific surface area and intrinsic pore size. The results were listed in Table 2-2.

As mentioned above, the obtained positive electrode material P10 was used in preparing a lithium ion battery sample, and subjected to the performance evaluation. The results were shown in Table 2-3.

TABLE 2-1 summary of materials and processing conditions used in the Examples and Comparative examples.

| | | Ex. 2-1 | Ex. 2-2 | CE. 2-1 | CE. 2-2 | CE. 2-3 |
|---|---|---|---|---|---|---|
| the preparation of a precursor of nickel cobalt manganese active material | molar ratio of NCM | 65:15:20 | 65:15:20 | 65:15:20 | 65:15:20 | 65:15:20 |
| | concentration of the solution of mixed salts | 1.7 mol/L | 1.7 mol/L | 1.7 mol/L | 1.7 mol/L | 1.7 mol/L |
| | precipitants | sodium hydroxide | sodium hydroxide | sodium hydroxide | sodium hydroxide | sodium hydroxide |
| | concentration of the solution of precipitants | 8 mol/L | 8 mol/L | 8 mol/L | 8 mol/L | 8 mol/L |
| | complexing agents | ammonia | ammonia | ammonia | ammonia | ammonia |
| | concentration of the solution of complexing agents | 13 mol/L | 13 mol/L | 13 mol/L | 13 mol/L | 13 mol/L |
| | ammonia concentration | 6 g/L | 6 g/L | 6 g/L | 6 g/L | 6 g/L |
| | temperature | 40° C. | 40° C. | 40° C. | 40° C. | 40° C. |
| | stirring speed | 600 rpm | 600 rpm | 600 rpm | 600 rpm | 600 rpm |
| | pH | 11.6 | 11.6 | 11.6 | 11.6 | 11.6 |
| the preparation of a doped nickel cobalt manganese active material | lithium source | lithium hydroxide | lithium hydroxide | lithium hydroxide | lithium hydroxide | lithium hydroxide |
| | first dopant | zirconium oxide | aluminum oxide | titanium oxide | aluminum oxide | aluminum oxide |
| | second dopant | yttrium oxide | niobium oxide | yttrium oxide | zirconium oxide | zirconium oxide |
| | third dopant | tungsten carbonate | strontium carbonate | strontium carbonate | strontium carbonate | strontium carbonate |
| | amounts in molar ratio | Li/precursor/Zr/Y/W = 1.05:0.99:0.006:0.002:0.002 | Li/precursor/Al/Nb/Sr = 1.05:0.99:0.005:0.003:0.002 | Li/precursor/Ti/Y/S r = 1.05:0.99:0.005:0.004:0.001 | Li/precursor/Al/Zr/Sr = 1.05:0.99:0.006:0.002:0.002 | Li/precursor/Al/Zr/Sr = 1.05:0.99:0.006:0.002:0.002 |
| | temperature for the first calcining | 300° C. | 300° C. | 300° C. | 300° C. | 300° C. |
| | time for the first calcining | 2 h | 2 h | 2 h | 2 h | 2 h |
| | flow rate of oxygen, Q | 1.33 m³/kg · h | 1.08 m³/kg · h | 1.33 m³/kg · h | 1.33 m³/kg · h | 1.33 m³/kg · h |
| | the second calcining temperature T | 870° C. | 870° C. | 870° C. | 800° C. | 870° C. |
| | time for the second calcining | 12 h | 14 h | 12 h | 12 h | 15 h |
| the preparation of a positive electrode material | coating agent | boric acid/aluminum hydroxide | boric acid/aluminum hydroxide | boric acid/aluminum hydroxide | boric acid/aluminum hydroxide | boric acid/aluminum hydroxide |
| | amounts in molar ratio | doped nickel cobalt manganese active material/boric acid/aluminum hydroxide = 1/0.01/0.01 | doped nickel cobalt manganese active material/boric acid/aluminum hydroxide = 1/0.01/0.01 | doped nickel cobalt manganese active material/boric acid/aluminum hydroxide = 1/0.01/0.01 | doped nickel cobalt manganese active material/boric acid/aluminum hydroxide = 1/0.01/0.01 | doped nickel cobalt manganese active material/boric acid/aluminum hydroxide = 1/0.01/0.01 |

TABLE 2-1-continued summary of materials and processing conditions used in the Examples and Comparative examples.

| | Ex. 2-1 | Ex. 2-2 | CE. 2-1 | CE. 2-2 | CE. 2-3 |
|---|---|---|---|---|---|
| temperature for the third calcining | 450° C. | 450° C. | 450° C. | 450° C. | 450° C. |
| time for the third calcining | 10 h | 10 h | 10 h | 10 h | 10 h |

TABLE 2-2 parameters of the positive electrode materials.

| | Ex. 2-1 | Ex. 2-2 | CE. 2-1 | CE. 2-2 | CE. 2-3 |
|---|---|---|---|---|---|
| intrinsic specific surface area (m$^2$/g) | 11.5 | 11.2 | 13.5 | 4.5 | 14.0 |
| $R_{10}$ (nm) | 2.4 | 2.4 | 2.7 | 2.0 | 2.8 |
| $R_{50}$ (nm) | 25.3 | 26.3 | 28.2 | 22.0 | 28.8 |
| $R_{90}$ (nm) | 130.8 | 137.4 | 178.1 | 90.7 | 186.6 |
| $SSA_{1.5}$ (nm) | 1.04 | 1.08 | 1.07 | 1.06 | 1.11 |
| $SSA_{2.5}$ (nm) | 1.30 | 1.31 | 1.42 | 1.45 | 1.52 |
| $SSA_{3.5}$ (nm) | 1.59 | 1.65 | 1.71 | 1.69 | 1.74 |
| $SSA_{4.5}$ (nm) | 1.87 | 1.84 | 1.98 | 1.92 | 2.04 |

TABLE 2-3 performances of the positive electrode materials.

| | Ex. 2-1 | Ex. 2-2 | CE. 2-1 | CE. 2-2 | CE. 2-3 |
|---|---|---|---|---|---|
| Li+ transference number (cm$^2$/g) | 10.1 × 10$^{-11}$ | 9.6 × 10$^{-11}$ | 8.3 × 10$^{-11}$ | 8.5 × 10$^{-11}$ | 7.9 × 10$^{-11}$ |
| specific discharging capacity at 0.1 C (mAh/g) | 191.6 | 191.2 | 190.9 | 190.2 | 190.5 |
| specific discharging capacity at 0.2 C (mAh/g) | 189.0 | 188.8 | 187.8 | 186.7 | 186.5 |
| specific discharging capacity at 0.33 C (mAh/g) | 186.4 | 186.3 | 185.8 | 183.4 | 183.8 |
| specific discharging capacity at 0.5 C (mAh/g) | 184.0 | 183.7 | 183.4 | 181.4 | 181.1 |
| specific discharging capacity at 1 C (mAh/g) | 178.4 | 179.0 | 177.5 | 176.5 | 176.1 |
| initial cycling efficiency (%) | 96.3 | 96.0 | 95.5 | 95.6 | 96.2 |
| capacity retention after 80 cycles (%) | 93.4 | 93.6 | 93.4 | 92.0 | 91.7 |

As shown in the above examples, compared to Examples 1-1 and 1-2, Comparative Example 1-1 changed the used dopant elements. Correspondingly, the positive electrode material obtained in Comparative Example 1-1 had an intrinsic specific surface area and an intrinsic pore distribution (R10, R50 and R90) both greater than those of the positive electrode materials in Examples 1-1 and 1-2. Correspondingly, it had a decreased cycle performance, with a capacity retention of only 88.6% after 80 cycles. At the same time, the positive electrode material obtained in Comparative Example 1-1 did not have a layered structure with sufficient ion stability, which made it easier to form cracks at grain boundaries, leading to a significant decrease in compressive strength. Therefore, although it had relatively good initial cycling capacity, it had degraded cycle performance at high current rates. Although Comparative example 1-2 involved the same dopant systems as those of Example 1-1 and Example 1-2, it used too low temperatures for the steps of calcining. It led to formation of incomplete crystal phases, poor construction of channels for transferring Li+, low Li+ transference number, and insufficient utilization of capacity. Comparative Example 1-3 used a reduced oxygen flow rate, leading to longer calcining time and slower oxidation. It resulted in severe Li/Ni disordering, easier formation of cracks at grain boundaries, and a decrease in compressive strength. At the same time, the transferring of Li+ was hindered. In this regard, although the initial capacity was normal, Li+ could not effectively return to its original position, leading to a decrease in both rate performance and cycle performance. When comparing Examples 2-1 and 2-2 with Comparative Examples 2-1 to 2-3, the results were consistent with the above.

The embodiments of the invention in which an exclusive property or privilege is claimed are defined as follows:

1. A positive electrode material comprising an intrinsic specific surface area of 5-13 m$^2$/g, wherein the positive electrode material has an intrinsic pore size which meets the following equations: 2.1 nm≤$R_{10}$≤2.5 nm, 23.0 nm≤$R_{50}$≤27.0 nm and 100.0 nm≤$R_{90}$≤160.0 nm.

2. The positive electrode material of claim 1, wherein the positive electrode material has an average particle size of 7.8-14.2 μm, or
the positive electrode material has a compacted density of 2.0-3.8 g/cm$^3$.

3. The positive electrode material of claim 1, wherein, when the positive electrode material is compressed under a pressure of 1.5 tons, the positive electrode material after compressing has an increase rate in the specific surface area $\Delta SSA_{1.5}$ of not more than 15%; or
when the positive electrode material is compressed under a pressure of 2.5 tons, the positive electrode material after compressing has an increase rate in the specific surface area $\Delta SSA_{2.5}$ of not more than 40%; or
when the positive electrode material is compressed under a pressure of 3.5 tons, the positive electrode material after compressing has an increase rate in the specific surface area $\Delta SSA_{3.5}$ of not more than 60%; or
when the positive electrode material is compressed under a pressure of 4.5 tons, the positive electrode material after compressing has an increase rate in the specific surface area $\Delta SSA_{4.5}$ of not more than 100%.

4. The positive electrode material of claim 1, comprising a doped nickel cobalt manganese active material and optionally a coating layer on at least part of the surface thereof, wherein the nickel cobalt manganese active material in the doped nickel cobalt manganese active material has a formula of $LiNi_xCo_yMn_zO_2$, wherein dopants of the doped nickel cobalt manganese active material comprise a first dopant element M, which is at least one selected from a group consisting of Al and Zr; a second dopant element G, which is at least one selected from a group consisting of Y, Ti, Nb, Cr, Er and Mg; and a third dopant element T, which is at least one selected from a group consisting of Ba, V, Sr, Ta, Mo, W and Ce, wherein the doped nickel cobalt manganese active material has a formula of $Li_{1+a}(Ni_xCo_yMn_zM_dG_eT_f)O_2$, wherein $0\leq a\leq 0.1$, $0.3\leq x\leq 0.99$, $0.01\leq y\leq 0.5$, $0.01\leq z\leq 0.5$, $0\leq d\leq 0.08$, $0\leq e\leq 0.05$, $0\leq f\leq 0.03$, $1\leq e/f\leq 5$, and $x+y+z+d+e+f=1$, and wherein the coating layer comprises at least one oxide selected from a group consisting of $B_2O_3$, $Al_2O_3$, $SiO_2$ and $W_2O_5$.

5. A positive electrode for a lithium battery, comprising the positive electrode material of claim 1.

6. A lithium battery, comprising a positive electrode, a negative electrode and a separator between the positive and negative electrodes, wherein the positive electrode comprises the positive electrode material of claim 1.

\* \* \* \* \*